United States Patent
Kawamata et al.

(10) Patent No.: US 7,050,224 B2
(45) Date of Patent: May 23, 2006

(54) FLUORESCENCE OBSERVING APPARATUS

(75) Inventors: Ken Kawamata, Hachioji (JP); Yorio Wada, Hanno (JP); Nobuyoshi Toyohara, Sagamihara (JP); Takeshi Deguchi, Matto (JP); Kunihiko Uzawa, Sagamihara (JP); Joji Sakamoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/702,433

(22) Filed: Nov. 7, 2003

(65) Prior Publication Data
US 2005/0099677 A1 May 12, 2005

(51) Int. Cl.
*F21V 9/04* (2006.01)
*F21V 9/06* (2006.01)
(52) U.S. Cl. .................. 359/359; 359/368; 356/417
(58) Field of Classification Search ................ 359/368, 359/580, 588, 590, 885, 890, 359; 385/116, 385/117; 356/417; 250/458.1
See application file for complete search history.

(56) References Cited

U.S. PATENT DOCUMENTS

| 5,408,996 | A | * | 4/1995 | Salb | 600/317 |
| 5,710,663 | A | * | 1/1998 | Kawasaki | 359/389 |
| 6,809,859 | B1 | * | 10/2004 | Erdogan et al. | 359/359 |

FOREIGN PATENT DOCUMENTS

JP          10-239517          9/1998

* cited by examiner

*Primary Examiner*—Mark A. Robinson
*Assistant Examiner*—Alessandro Amari
(74) *Attorney, Agent, or Firm*—Kenyon & Kenyon LLP

(57) ABSTRACT

A fluorescence observing apparatus has an excitation filter unit for transmitting only exciting light with particular wavelengths, of illuminating light, and an absorption filter unit for transmitting only fluorescent light produced from a specimen by irradiating the specimen with the exciting light to block the exciting light. In this case, the space between the half-value wavelength on the long-wavelength side of the excitation filter unit and the half-value wavelength on the short-wavelength side of the absorption filter unit is in the range of 6–12 nm, and variations in the half-value wavelengths of the excitation filter unit and the absorption filter unit where humidity is changed from 10% to 95% are within 0.5 nm. Whereby, faint fluorescent light is efficiently taken out and the observation can be made.

16 Claims, 5 Drawing Sheets

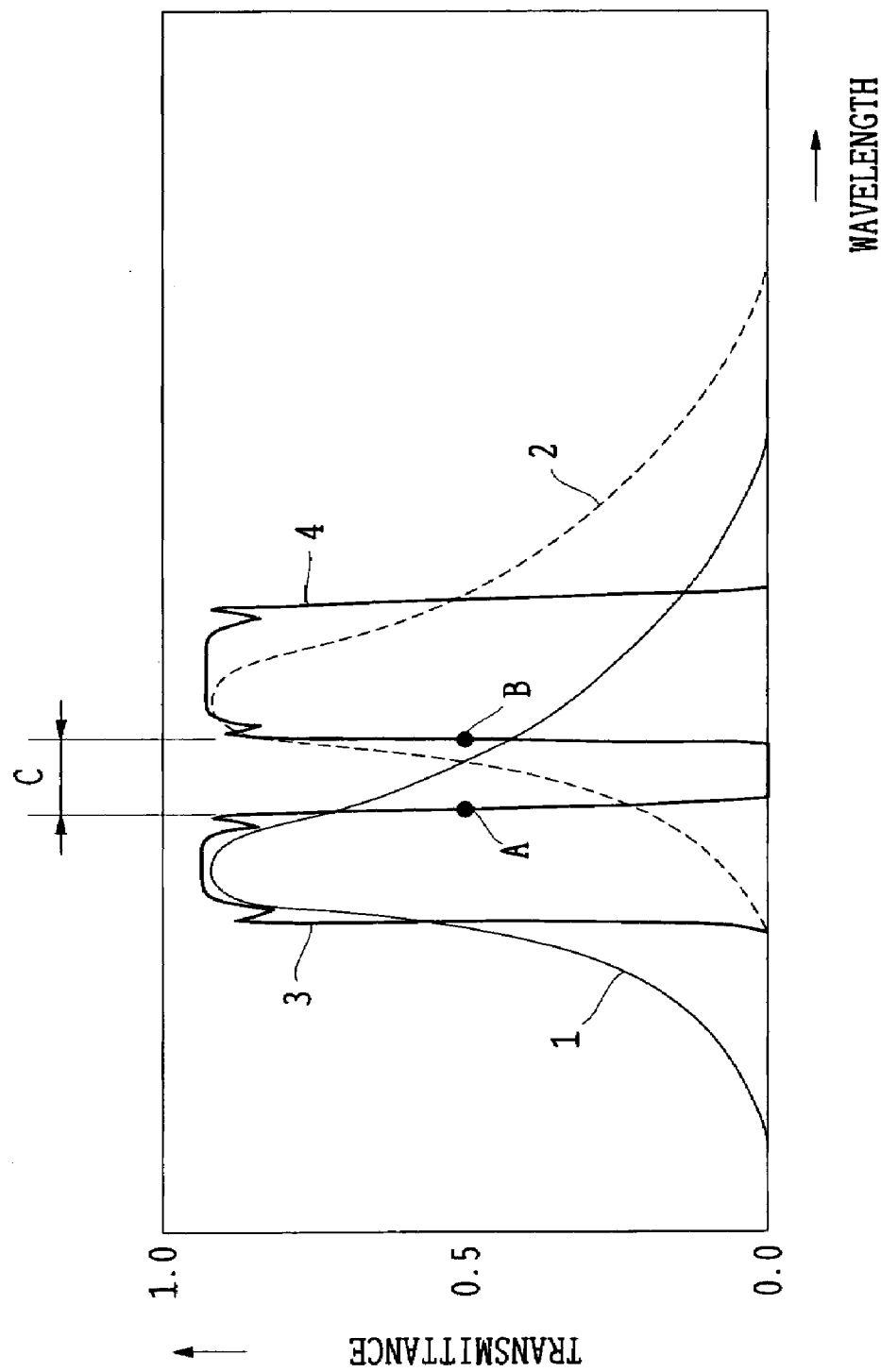

FLUORESCENCE OBSERVING APPARATUS

BACKGROUND OF THE INVENTION

1. Field of the Invention

This invention relates to a fluorescence observing apparatus used in a microscope or an endoscope.

2. Description of Related Art

It has been carried out that a specimen, such as living tissue, is irradiated with exciting light and thereby fluorescent light produced from the specimen is used for observation. This fluorescence observation requires the use of an excitation filter unit for transmitting only exciting light with particular wavelengths, of illuminating light, and an absorption filter unit for transmitting only fluorescent light produced from the specimen by irradiating the specimen with the exciting light to block the exciting light.

For example, an endoscope for fluorescence observation is set forth in Japanese Patent Kokai No. Hei 10-239517. This fluorescence observing endoscope apparatus is designed to carry out the fluorescence observation in such a way that the excitation filter unit transmits light with wavelengths less than 460 nm, with which a living body is irradiated to produce fluorescent light, and the absorption filter unit transmits light with wavelengths of 480–600 nm.

In general, the fluorescent light produced from the specimen is faint, and it is important that only the fluorescent light is efficiently taken out. This is governed by the performance requirements of the excitation filter unit and the absorption filter unit.

FIG. 1 shows the relationship that a specimen is irradiated with exciting light 1 and thereby fluorescent light 2 with longer wavelengths than the exciting light 1 is produced for use in the fluorescence observation. In this relationship, it is desirable that an excitation filter unit 3 transmits the greatest possible deal of exciting light and the absorption filter unit completely cuts off the exciting light and transmits the greatest possible deal of fluorescent light. For this purpose, it is necessary that a space C between a half-value wavelength A on the long-wavelength side in the region of wavelengths transmitted by the excitation filter unit 3 (which is hereinafter referred to as "the half-value wavelength on the long-wavelength side of the excitation filter unit 3") and a half-value wavelength B on the short-wavelength side in the region of fluorescent wavelengths transmitted by the absorption filter unit 4 (which is hereinafter referred to as "the half-value wavelength on the short-wavelength side of the absorption filter unit 4") is as narrow as possible and the wavelength regions do not overlap.

The reasons why the space between the half-value wavelength on the long-wavelength side of the excitation filter unit and the half-value wavelength on the short-wavelength side of the absorption filter unit is provided are that (1) the stability of spectral characteristics of the filters is not complete and (2) there is a limit to the number of layers of each filter in fabrication.

Reason (1) is based on the fact that since a conventional filter is made by a vacuum evaporation method, film density is not complete, and moisture is absorbed into, or discharged from, a multilayer film because of ambient humidity so that the spectral characteristic curves are shifted. In this case, a shift of approximately ±5 nm is supposed. Even with this shift, the half-value wavelength on the long-wavelength side of the excitation filter unit and the half-value wavelength on the short-wavelength side of the absorption filter unit must not overlap, and thus the space between them needs to be widened in design.

In Reason (2), the number of layers is increased and thereby the spectral transmission characteristic curves of the half-value wavelength on the long-wavelength side of the excitation filter unit and the half-value wavelength on the short-wavelength side of the absorption filter unit can be made to rise steeply so that the transmission areas of the two filters are hard to overlap.

In the vacuum evaporation method which has been used from the past, however, the problems of a fabrication error and intimate film deposition are produced and hence, in fact, film deposition is limited to about 50 layers.

SUMMARY OF THE INVENTION

The present invention is designed to use filters such that variations in the half-value wavelengths of the excitation filter unit and the absorption filter unit where humidity is changed from 10% to 95% are within 0.5 nm, and thereby Reason (1) is eliminated. Film forming techniques involve the use of ion assist processes, ion plating processes, and sputtering processes which are much higher in film density than the conventional vacuum evaporation methods. Consequently, even when the space between the half-value wavelength on the long-wavelength side of the excitation filter unit and the half-value wavelength on the short-wavelength side of the absorption filter unit is as narrow as 6–12 nm, the spectral characteristic curves of the filters are little shifted, and thus the transmission areas of the two filters do not over-lap. Since the space is made narrower than in the conventional practice, faint fluorescent light can be efficiently observed.

Furthermore, the present invention is constructed so that the excitation filter unit and/or the absorption filter unit includes a multilayer film comprised of at least 90 layers, and thereby Reason (2) is eliminated. Consequently, even when the space between the two filters is narrowed, their transmission areas cease to overlap. Such a filter can be formed of the multilayer film comprised of $SiO_2$ and $Ta_2O_5$, for instance. The present invention is applicable to an endoscope or a microscope in which the fluorescence observation is carried out.

The present invention provides a fluorescence observing apparatus which has an excitation filter unit for transmitting only exciting light with particular wavelengths, of illuminating light, and an absorption filter unit for transmitting only fluorescent light produced from a specimen by irradiating the specimen with the exciting light to block the exciting light. In this case, the space between the half-value wavelength on the long-wavelength side of the excitation filter unit and the half-value wavelength on the short-wavelength side of the absorption filter unit is in the range of 6–12 nm.

Further, the present invention provides a fluorescence observing apparatus which has an excitation filter unit for transmitting only exciting light with particular wavelengths, of illuminating light, and an absorption filter unit for transmitting only fluorescent light produced from a specimen by irradiating the specimen with the exciting light to block the exciting light. In this case, the space between the half-value wavelength on the long-wavelength side of the excitation filter unit and the half-value wavelength on the short-wavelength side of the absorption filter unit is in the range of 6–12 nm, and variations in the half-value wavelengths of the excitation filter unit and the absorption filter unit where humidity is changed from 10% to 95% are within 0.5 nm.

According to the present invention, preferably, the excitation filter unit and/or the absorption filter unit includes a multilayer film comprised of at least 90 layers.

Further, according to the present invention, preferably, each of the excitation filter unit and the absorption filter unit includes a multilayer film comprised of $SiO_2$ and $Ta_2O_5$.

According to the present invention, in the fluorescence observing apparatus using the excitation filter unit and the absorption filter unit, faint fluorescent light can be efficiently taken out. Hence, when a living specimen is especially fluorescence-observed, it is possible to observe the specimen in vivo without deteriorating the specimen.

These and other features and advantages of the present invention will become apparent from the following detailed description of the preferred embodiments when taken in conjunction with the accompanying drawings.

BRIEF DESCRIPTION OF THE DRAWINGS

FIG. 1 is a diagram showing spectral characteristic curves of an excitation filter unit and an absorption filter unit;

DETAILED DESCRIPTION OF THE PREFERRED EMBODIMENTS

First Embodiment

In this embodiment, the present invention is applied to a microscope in which fluorescence observation can be carried out.

Figure 2A:
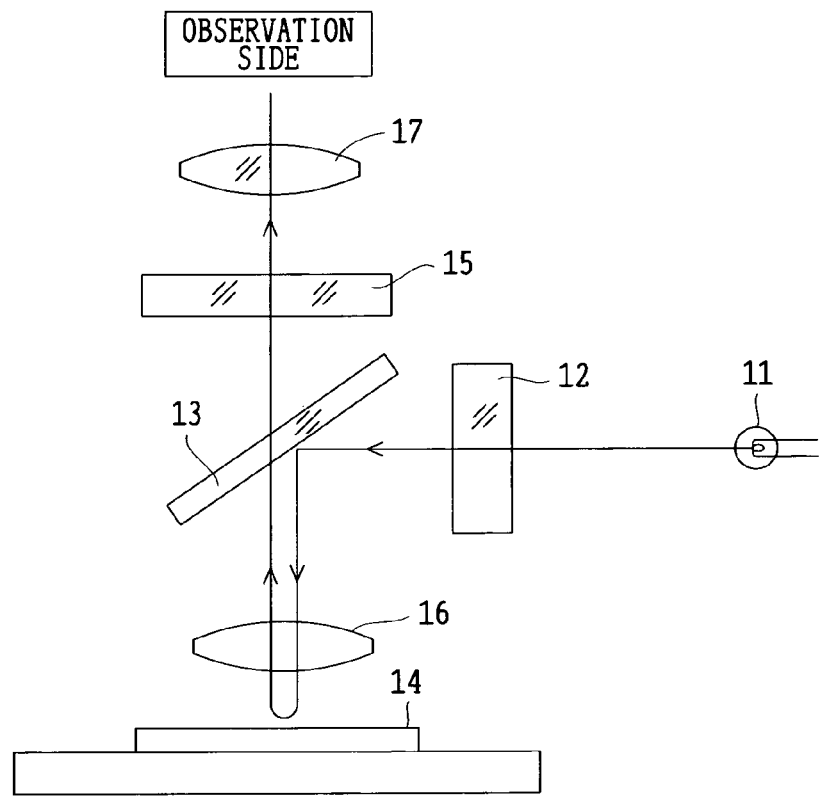
FIG. 2A is a view showing schematically a microscope in a first embodiment of the present invention.

FIG. 2A shows the optical path of the microscope. Of light emitted from a light source 11, only light with particular wavelengths is selectively transmitted by an excitation filter unit 12. The light transmitted through the excitation filter unit 12 is such that its optical path is bent by a dichroic mirror 13, and a specimen 14 is irradiated with the light. By this irradiation, fluorescent light is produced from the specimen 14. Only the fluorescent light produced from the specimen 14 is selectively transmitted by an absorption filter unit 15. This fluorescent light, after being transmitted through an eyepiece 17, is observed on the observation side.

Figure 3:
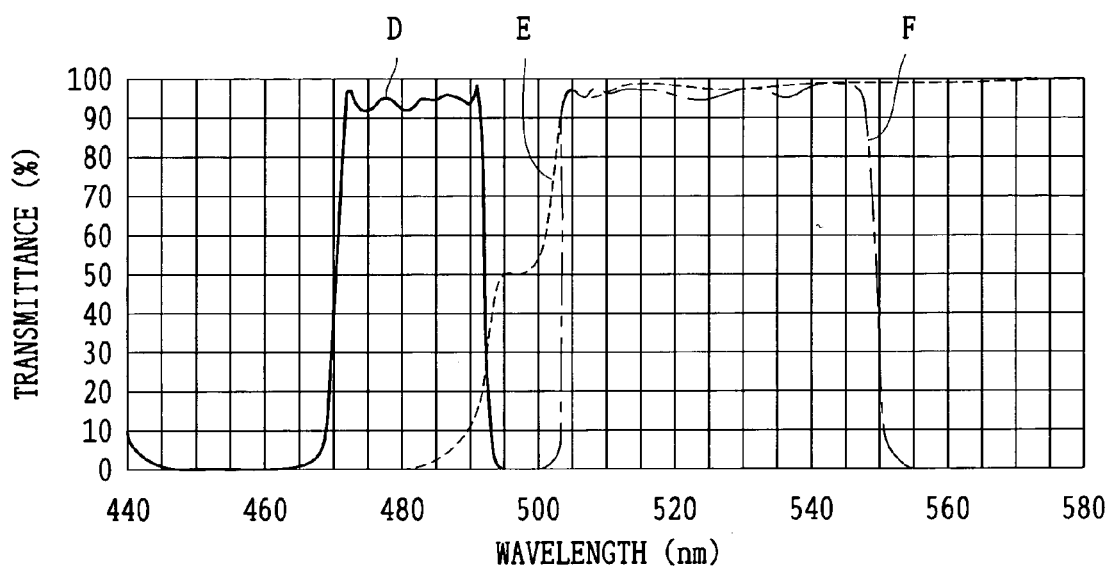
FIG. 3 is a diagram showing spectral characteristic curves of filters used in the first embodiment.

FIG. 3 shows spectral characteristic curves of the excitation filter unit 12, the dichroic mirror 13, and the absorption filter unit 15, used in the microscope. In this figure, reference symbol D denotes the characteristic curve of the excitation filter unit 12, E denotes the characteristic curve of the dichroic mirror 13, and F denotes the characteristic curve of the absorption filter unit 15.

The half-value wavelength on the long-wavelength side of the excitation filter unit 12 is 493 nm, and the half-value wavelength on the short-wavelength side of the absorption filter unit 15 is 503 nm. The space between them is as narrow as 10 nm. Consequently, the fluorescent light can be efficiently produced from the specimen and can be efficiently observed.

Each of the excitation filter unit 12 and the absorption filter unit 15 is depicted as a single filter in FIG. 2A, but actually it is constructed by combining of a plurality of filters.

Figure 2B:
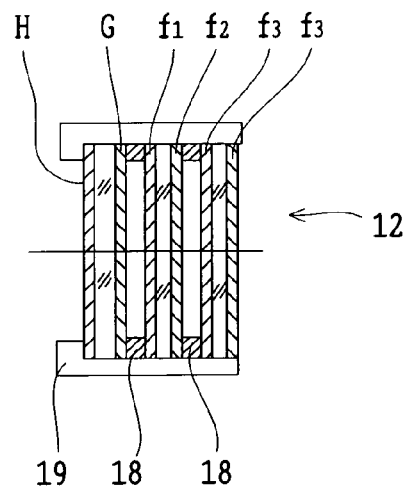
FIG. 2B is a view showing the structure of the excitation filter unit in FIG. 2A.
Figure 4:
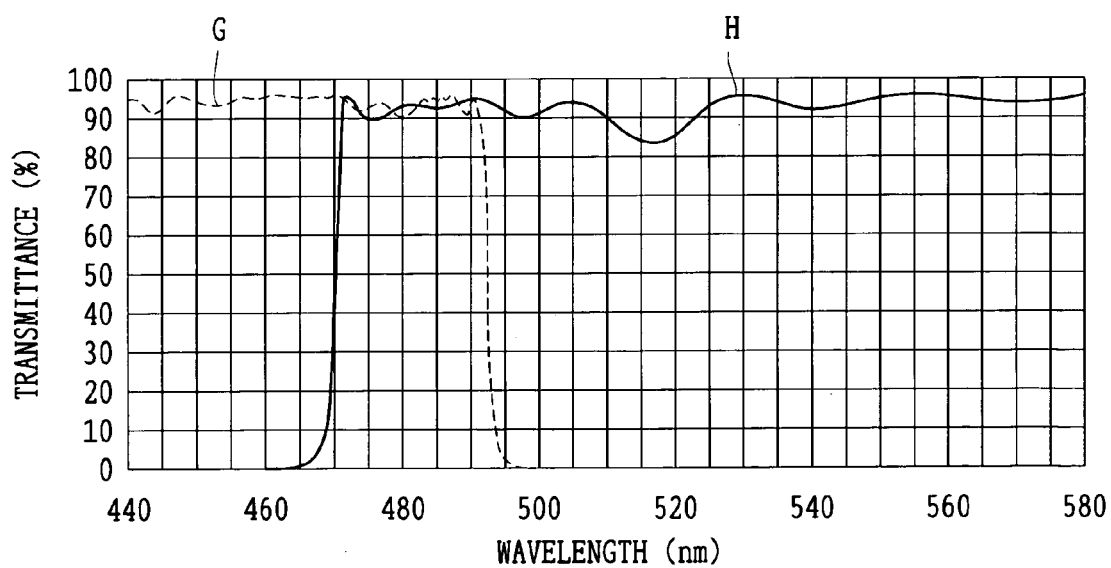
FIG. 4 is a diagram showing spectral characteristic curves of a long-wave pass filter and a short-wave pass filter.

For example, the excitation filter unit 12, as minutely shown in FIG. 2B, is such that six filters H, G, $f_1$, $f_2$, $f_3$, and $f_3$ are assembled by using three glass base plates. Basically, two filter of a long-wave pass (LWP) filter H and a short-wave pass (SWP) filter G, such as those shown in FIG. 4, are placed on both surfaces of a single glass base plate. In addition, of the three filters $f_1$, $f_2$, and $f_3$ cutting off ultraviolet light, infrared light, and unwanted visible light, respectively, the filters $f_1$ and $f_2$ are placed on both surfaces of a single glass base plate, and the filters $f_3$ and $f_3$ are placed on both surfaces of a single glass base plate.

In the excitation filter unit 12, the SWP filter G which exerts the most powerful influence upon the performance of the fluorescence observation has a 91-layer structure in which $SiO_2$ and $Ta_2O_5$ are alternately laminated, and is formed by the ion plating process of an RF substrate application system. The LWP filter H has a 54-layer structure in which $SiO_2$ and $Ta_2O_5$ likewise are alternately laminated, and is formed by the ion plating process of the RF substrate application system. Each of the filters cutting off ultraviolet light, infrared light, and unwanted visible light has the structure in which $SiO_2$ and $TiO_2$ are alternately laminated. Specifically, the ultraviolet cutoff filter $f_1$ has 40 layers, the infrared cutoff filter $f_2$ has 46 layers, and the unwanted-visible cutoff filter $f_3$ has 40 layers, which are made by the vacuum evaporation method. These filters H, G, $f_1$, $f_2$, $f_3$, and $f_3$ are assembled in a frame 19 through two spacers 18 (see FIG. 2B).

The absorption filter unit 15 likewise includes the LWP filter, the SWP filter, and the unwanted-light cutoff filters. If, of fluorescent light produced, fluorescent light unnecessary for observation is cut off by the LWP filter and the SWP filter which constitute the absorption filter unit 15, the unwanted-light cutoff filters need not necessarily be used. In this example, the absorption filter unit is constructed by providing the LWP filter and the SWP filter on both surfaces of a single glass base plate. By using the SWP filter cutting off wavelengths ranging from 560 nm to 850 nm, all of the fluorescent light unnecessary for observation can be cut off. As such, there is no need to increase the number of filters.

In the absorption filter unit 15, the LWP filter which exerts the most powerful influence upon the performance of the fluorescence observation has a 115-layer structure in which $SiO_2$ and $Ta_2O_5$ are alternately laminated, and is formed by the ion plating process of the RF substrate application system. The SWP filter has a 90-layer structure in which $SiO_2$ and $Ta_2O_5$ likewise are alternately laminated, and is formed by the ion plating process of the RF substrate application system.

Also, optical glass BK 17 is used as the glass base plate in each of the excitation filter unit 12 and the absorption filter unit 15.

The filters formed by the ion plating process of the RF substrate application system are such that variations in the half-value wavelengths where humidity is changed from 10% to 95% are 0–+0.1 nm, any of which is within 0.5 nm.

The above microscope is used to carry out the fluorescence observation of a living specimen. Since the fluorescent light can be taken out and observed at extremely high efficiency, a satisfactory observation can be carried out even when the brightness of illuminating light is attenuated. On the other hand, in the conventional microscope, the brightness of illuminating light must be amplified for the fluorescence observation, but the living specimen is degraded by the influence of the light and cannot be observed in vivo.

Also, the space between the half-value wavelength on the long-wavelength side of the excitation filter unit 12 and the half-value wavelength on the short-wavelength side of the absorption filter unit 15 is 10 nm, but even when the space is changed to 6–12 nm by shifting the spectral characteristic curves of the filters, there is little difference in the result of the observation. In either case, the living specimen is not degraded and can be observed in vivo.

Even when the filter made by the ion plating process of the RF substrate application system is replaced with a filter made by the ion assist process or an ion beam sputtering process, the same result can be achieved.

Second Embodiment

In this embodiment, the present invention is applied to a medical endoscope in which the disease of the living tissue is diagnosed by making the fluorescence observation.

Figure 5:
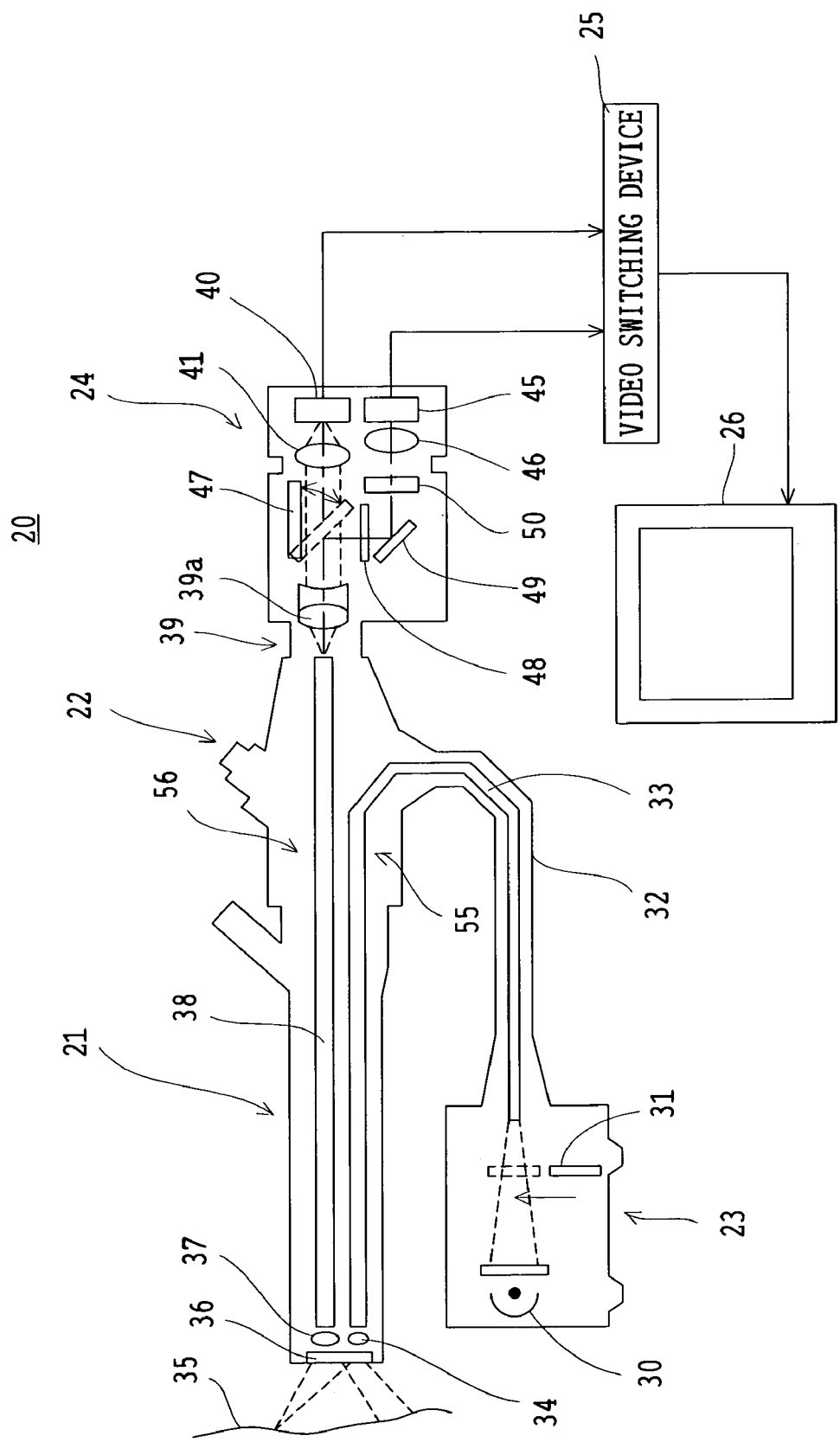
FIG. 5 is a view showing schematically an endoscope in a second embodiment of the present invention.

A description is given of the medical endoscope. As shown in FIG. 5, a medical endoscope 20 roughly includes an endoscope body 22 provided with an inserting section 21 inserted into the human body, a light source section 23, and an imaging section 24. A monitor TV 26 is connected to the imaging section 24 through a video switching device 25.

In the light source section 23, a light source 30 for illuminating a living body 35 in the human body and an excitation filter unit 31 used for the fluorescence observation are arranged. When the fluorescence observation is not made, the excitation filter unit 31 is moved outside the optical path of a light beam for illumination emitted from the light source 30. A light guide fiber 33 which introduces illuminating light into the human body is encased in a connecting tube 32 connecting the light source section 23 with the endoscope body 22. One end of the fiber 33 is mounted inside the tip of the inserting section 21 of the endoscope 20. An illumination lens 34 is placed at the tip of the fiber 33 so that the interior of the human body is illuminated in a wide range.

An observation window 36, an objective system 37, an image guide fiber 38, and an eyepiece section 39 housing an eyepiece 39a are arranged in turn so that reflected light from the living body 35 irradiated with the illuminating light is introduced into the imaging section 24. Specifically, the observation window 36 is placed at the tip of the inserting section 21, and the objective system 37 is provided inside the tip of the inserting section 21. The image guide fiber 38 is placed inside the inserting section 21 so as to conduct the image of the living body 35 by the reflected light, formed by the objective system 37, and the eyepiece section 39 housing the eyepiece 39a is located at the position where the image of the living body 35 emerging from the fiber 38 is introduced into the imaging section 24.

The imaging section 24 incorporates an image-forming optical system 41 forming an image in a CCD camera 40 for ordinary observation and an image-forming optical system 46 forming an image in a CCD camera 45 for fluorescence observation. When an observation mode is changed from the ordinary observation to the fluorescence observation, the image-forming optical system 41 is switched to the image-forming optical system 46 by the video switching device 25 so that the image is displayed on the monitor TV 26. In the changeover from the image-forming optical system 41 to the image-forming optical system 46 by the video switching device 25, the excitation filter unit 31 in the light source section 23 is inserted into the optical path of the illuminating light, and a reflecting mirror 47 is also inserted into the image-forming optical system 41 so that light for fluorescence observation is transmitted through an absorption filter unit 48, and after being reflected by a reflecting mirror 49, passes through an image intensifier 50 placed to amplify the brightness of the image formed by the image-forming optical system 46. Also, the reflecting mirror 47 is moved outside the optical path of the image-forming optical system 41 when the ordinary observation is carried out by the CCD camera 40.

The construction and optical system of the endoscope 20 are the same as those disclosed in Kokai No. Hei 10-239517. Thus, as shown in FIG. 5, an illumination optical system 55 is constructed with the light guide fiber 33 and the lens 34 so that the illuminating light from the light source 30 is introduced into the living tissue, and the excitation filter unit 31 transmitting only exciting light with particular wavelengths is inserted into the optical path of the illumination optical system 55.

On the other hand, an observation optical system 56 is constructed with the objective system 37 on which fluorescent light produced from the living tissue is incident, the image guide fiber 38, the eyepiece 39a for observation, and the image-forming optical system 46, and the absorption filter unit 48 transmitting only fluorescent light is inserted into the optical path of the observation optical system 56.

In the endoscope 20, fluorescent light is produced from the living tissue by the irradiation of exciting light passing through the excitation filter unit 31, and the observation of the living tissue is carried out in accordance with the fluorescent light, obtained by the absorption filter unit 48 transmitting only fluorescent light, of reflected light derived from the living tissue.

Figure 6:
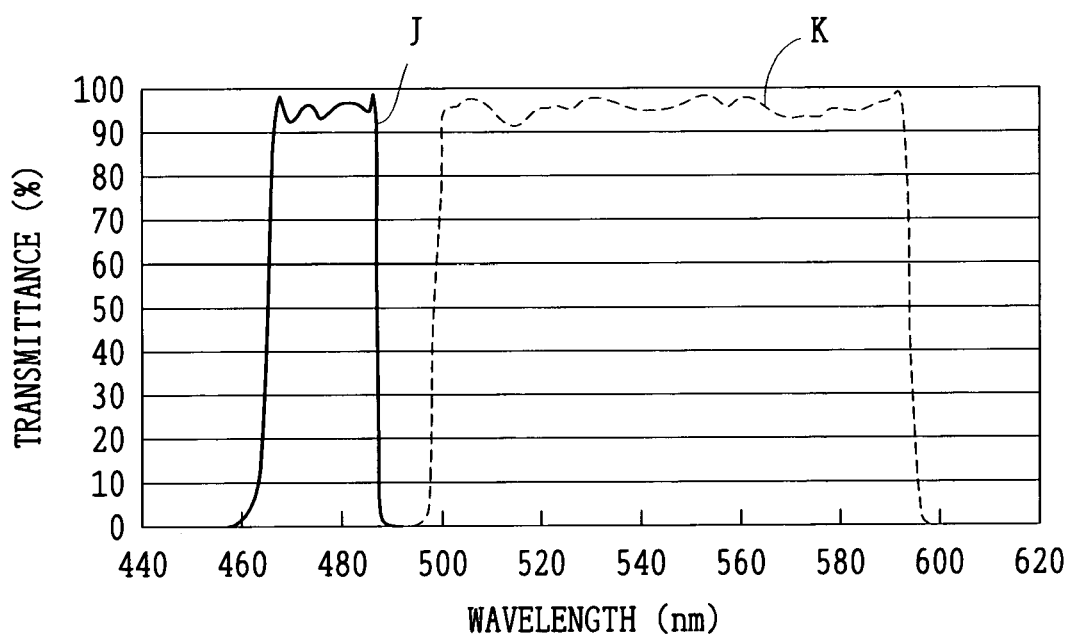
FIG. 6 is a diagram showing spectral characteristic curves of the excitation filter unit and the absorption filter unit, used in the endoscope in the second embodiment.

FIG. 6 shows spectral characteristic curves of individual filters used in the second embodiment. In this figure, reference symbol J designates the characteristic curve of the excitation filter unit 31 and K designates the characteristic curve of the absorption filter unit 48. The half-value wavelength on the long-wavelength side of the excitation filter unit 31 is 486 nm, and the half-value wavelength on the short-wavelength side of the absorption filter unit 48 is 498 nm. The space between them is 12 nm.

The SWP filter H of the excitation filter unit 31 and the LWP filter G of the absorption filter unit 48 are made in such a way that $SiO_2$ and $Ta_2O_5$ are alternately laminated by the ion assist evaporation process. For the numbers of layers, these filters have 78 layers and 99 layers, respectively.

The LWP filter G of the excitation filter unit 31 and the SWP filter H of the absorption filter unit 48, like the first embodiment, are made in such a way that $SiO_2$ and $Ta_2O_5$ are alternately laminated by the ion plating process of the RF substrate application system. For the numbers of layers, these filters have 54 layers and 90 layers, respectively.

Each of the filters $f_1$, $f_2$, and $f_3$, which are used to constitute the excitation filter unit 31 and cut off ultraviolet light, infrared light, and unwanted visible light, respectively, like the first embodiment, has the structure that $SiO_2$ and $TiO_2$ are alternately laminated. The ultraviolet cutoff filter $f_1$ has 40 layers, the infrared cutoff filter $f_2$ has 46 layers, and the unwanted-visible cutoff filter $f_3$ has 40 layers, which are made by the vacuum evaporation method.

When the SWP filter H, the LWP filter G, and the filters $f_1$, $f_2$, $f_3$, and $f_3$, which constitute the excitation filter unit 31 in the second embodiment, are assembled, the structure is as shown in FIG. 2B. The absorption filter unit 48 also, like the first embodiment, has the structure that LWP filter G and the SWP filter H are placed on both surfaces of the single glass base plate.

The second embodiment has the LWP filters G and the SWP filters H which are made by the ion assist evaporation process and the ion plating process of the RF substrate application system. The excitation filter unit 31 and the absorption filter unit 48 are such that variations in half-value wavelengths where humidity is changed from 10% to 95% are within 0.5 nm in any case.

Also, in the above description, the half-value wavelength A on the long-wavelength side of the excitation filter unit refers to a wavelength on the long-wavelength side where the transmittance of the excitation filter unit is a half of its maximum value in the spectral characteristic graph of FIG. 1, 3, or 6. The half-value wavelength B on the short-wavelength side of the absorption filter unit refers to a wavelength on the shot-wavelength side where the transmittance of the absorption filter unit is a half of its maximum value.

What is claimed is:

1. A fluorescence observing apparatus, having:
   an excitation filter unit for transmitting only exciting light with particular wavelengths, of illuminating light; and
   an absorption filter unit for transmitting only fluorescent light produced from a specimen by irradiating the specimen with the exciting light to block the exciting light,
   wherein a space between a half-value wavelength on a long-wavelength side of the excitation filter unit and a half-value wavelength on a short-wavelength side of the absorption filter unit is in a range of 6–12 nm,
   wherein the excitation filter unit has an ultraviolet cutoff filter formed on a base plate, and
   wherein variations in half-value wavelengths of the excitation filter unit and the absorption filter unit where humidity is changed from 10% to 95% are within 0.5 nm.

2. A fluorescence observing apparatus according to claim 1, wherein the excitation filter unit and/or the absorption filter unit includes a multiplayer film comprised of at least 90 layers.

3. A fluorescence observing apparatus according to claim 1, wherein each of the excitation filter unit and the absorption filter unit includes a multilayer film comprised of $SiO_2$ and $Ta_2O_5$.

4. A fluorescence observing apparatus according to claim 1, incorporated in an optical system of a microscope.

5. A fluorescence observing apparatus according to claim 1, incorporated in an optical system of an endoscope.

6. A fluorescence observing apparatus according to claim 1, wherein each of the excitation filter unit and the absorption filter unit includes a multiplayer film comprised of $SiO_2$ and $Ta_2O_5$, and the excitation filter unit and/or the absorption filter unit includes a multiplayer film comprised of at least 90 layers.

7. A fluorescence observing apparatus according to claim 1, incorporated in an optical system of a microscope, wherein each of the excitation filter unit and the absorption filter unit includes a multiplayer film comprised of $SiO_2$ and $Ta_2O_5$, and the excitation filter unit and/or the absorption filter unit includes a multiplayer film comprised of at least 90 layers.

8. A fluorescence observing apparatus according to claim 1, incorporated in an optical system of an endoscope, wherein each of the excitation filter unit and the absorption filter unit includes a multiplayer film comprised of $SiO_2$ and $Ta_2O_5$, and the excitation filter unit and/or the absorption filter unit includes a multiplayer film comprised of at least 90 layers.

9. A fluorescence observing apparatus having:
   an excitation filter unit for transmitting only exciting light with particular wavelengths, of illuminating light; and
   an absorption filter unit for transmitting only fluorescent light produced from a specimen by irradiating the specimen with the exciting light to block the exciting light,
   wherein space between a half-value wavelength on a long-wavelength side of the excitation filter unit and a half-value wavelength on a short-wavelength side of the absorption filter unit is in a range of 6–12 nm, and
   wherein variations in half-value wavelengths of the excitation filter unit and the absorption filter unit where humidity is changed from 10% to 95% are within 0.5 nm.

10. A fluorescence observing apparatus according to claim 9, wherein the excitation filter unit and/or the absorption filter unit includes a multiplayer film comprised of at least 90 layers.

11. A fluorescence observing apparatus according to claim 9, wherein each of the excitation filter unit and the absorption filter unit includes a multiplayer film comprised of $SiO_2$ and $Ta_2O_5$.

12. A fluorescence observing apparatus according to claim 9, incorporated in an optical system of a microscope.

13. A fluorescence observing apparatus according to claim 9, incorporated in an optical system of an endoscope.

14. A fluorescence observing apparatus according to claim 9, wherein each of the excitation filter unit and the absorption filter unit includes a multiplayer film comprised of $SiO_2$ and $Ta_2O_5$, and the excitation filter unit and/or the absorption filter unit includes a multiplayer film comprised of at least 90 layers.

15. A fluorescence observing apparatus according to claim 9, incorporated in an optical system of a microscope, wherein each of the excitation filter unit and the absorption filter unit includes a multiplayer film comprised of $SiO_2$ and $Ta_2O_5$, and the excitation filter unit and/or the absorption filter unit includes a multiplayer film comprised of at least 90 layers.

16. A fluorescence observing apparatus according to claim 9, incorporated in an optical system of an endoscope, wherein each of the excitation filter unit and the absorption filter unit includes a multiplayer film comprised of $SiO_2$ and $Ta_2O_5$, and the excitation filter unit and/or the absorption filter unit includes a multiplayer film comprised of at least 90 layers.

* * * * *